United States Patent [19]

Anderson et al.

[11] Patent Number: 5,104,101

[45] Date of Patent: Apr. 14, 1992

[54] BUFFER CARTRIDGE

[75] Inventors: David G. Anderson, Chesterton, Ind.; Hente Braam, Huntley, Ill.

[73] Assignee: Miner Enterprises, Inc., Geneva, Ill.

[21] Appl. No.: 514,388

[22] Filed: Apr. 25, 1990

[51] Int. Cl.⁵ ............................................... F16F 1/36
[52] U.S. Cl. ............................. 267/219; 188/298; 188/322.22; 188/322.17; 213/40 D; 213/45; 267/293; 267/141.1; 267/153; 267/294; 267/152
[58] Field of Search ............ 267/219, 220, 35, 64.13, 267/292-294, 64.19, 64.23, 64.27, 69-70, 121, 3, 122, 124, 140.1, 141, 141.1, 153, 152, 140, 129, 120; 188/281, 282, 284, 298, 311, 313, 314-317, 322.15, 322.22, 322.16, 322.17, 322.18; 213/32 A, 43, 45, 40 D; 92/248, 168, 170.1; 280/716, 710; 105/198.3, 224.1, 198.7

[56] References Cited

U.S. PATENT DOCUMENTS

| | | | |
|---|---|---|---|
| 1,772,414 | 8/1930 | Brooke-Hunt et al. | 267/293 |
| 2,320,697 | 6/1943 | Binder | 188/322.15 X |
| 2,486,741 | 11/1949 | Gabriel | 267/293 |
| 2,553,635 | 5/1951 | Dath | 213/40 D |
| 2,713,483 | 7/1955 | Tillou | 267/294 X |
| 2,982,536 | 5/1961 | Kordes | 267/153 |
| 3,024,874 | 3/1962 | DeKoning et al. | 188/317 X |
| 3,380,729 | 4/1968 | Hoffmann et al. | 267/35 X |
| 3,484,090 | 12/1969 | Mahoney | 188/298 X |
| 3,515,382 | 6/1970 | Gallagher | 267/152 |
| 3,686,708 | 8/1972 | DiNoia et al. | 188/322.15 X |
| 3,729,101 | 4/1973 | Brambilla et al. | 267/35 X |
| 3,730,305 | 5/1973 | Fouts | 188/322.18 |
| 3,795,390 | 3/1974 | Kendall et al. | 267/35 X |
| 3,819,219 | 6/1974 | Pamer | 188/298 X |
| 3,826,481 | 7/1974 | Oeser | 267/152 |
| 3,891,199 | 6/1975 | Willich et al. | 188/298 X |
| 4,002,244 | 1/1977 | Matsumoto et al. | 213/45 X |
| 4,198,037 | 4/1980 | Anderson | 267/153 |
| 4,566,701 | 1/1986 | Bomgardner | |
| 4,815,574 | 3/1989 | Taylor et al. | |

FOREIGN PATENT DOCUMENTS

| | | | |
|---|---|---|---|
| 0920294 | 11/1954 | Fed. Rep. of Germany | 188/322.22 |
| 0949064 | 8/1949 | France | 267/294 |
| 0038850 | 4/1978 | Japan | 92/248 |
| 816089 | 7/1959 | United Kingdom | 267/294 |
| 2027517 | 2/1980 | United Kingdom | 267/219 |
| 2033537 | 5/1980 | United Kingdom | 92/248 |
| 2064062 | 6/1981 | United Kingdom | 188/322.22 |

Primary Examiner—Douglas C. Butler

[57] ABSTRACT

A buffer cartridge for absorbing energy having a hydraulic component coupled with an energy-absorbing material component, the hydraulic component having a cylinder-piston arrangement, the cylinder being surrounded by a stack of pads made from resilient energy-absorbing material, each pad being separated by a spacer. The free end of the piston emerging from the cylinder is connected to an intercoupling member which can simultaneously apply a force to both the piston and the stack of pads. A stretchable accumulator seal surrounds a piston rod within the cylinder and provides a sealing sliding path for the piston rod to isolate the moving portion of the piston rod from hydraulic fluid. The piston rod terminates in a piston having a piston hub encapsulated in resilient material and provided with orificed passageways for flow of fluid to both sides of the piston.

14 Claims, 1 Drawing Sheet

BUFFER CARTRIDGE

BACKGROUND OF THE INVENTION

1. Field of the Invention

This invention relates to shock absorbing devices, and more particularly to an energy absorbing device utilizing compressibility of resistant materials in conjunction with hydraulic principles.

2. Description of the Prior Art

Energy absorbing devices based on the hydraulic principle generally comprise a cylinder having one closed end and an open end for introduction of a piston which is adapted to apply a force to a fluid within the cylinder. The cylinder, at its closed end, is secured to a first member and a free end of the piston is secured to another member which is relatively movable with respect to the first member. Orifice means are provided to permit movement of fluid from one side of the piston to the backside of the piston. The free end of the piston extends through a cap enclosing the other end of the cylinder. To avoid leakage of the fluid in the area of the cap encompassing the sliding piston rod, it is necessary to incorporate a seal. To prevent premature wearing out of the seal, it is necessary to expend time in polishing the surface of the piston rod. But even so, after a period of use, the seal will be worn and eventually leaking will occur. Therefore, it will be necessary either to apply further pressure on the seal to grip the piston rod in a more secure way, or it is necessary to totally replace the seal.

Another problem associated with hydraulic devices is the wear of a resilient seal mounted on the piston and engaging the inner surface of the cylinder. After a protracted period of use, the piston seal will be worn, and fluid leakage will occur, thereby changing the energy absorbing capability of the hydraulic device. To avoid the disadvantages described with respect to the hydraulic energy absorber devices, non-hydraulic energy absorbing devices have been developed based on the principle of using force absorption elastomer materials. For example, U.S. Pat. No. 4,756,512 overcomes the deficiencies associated with struts employing hydraulic principles by designing a suspension strut using elastomer material pads assembled in stacks, as sold by Miner Enterprises, Inc., of Geneva, Ill., under the trademark (TECSPAK), and more fully described in U.S. Pat. No. 4,198,037. Such strut assembly comprises a pair of telescoped tubes housing therein a stack of elastomer material pads, each having a central opening for admitting a steel guide rod. The pads are separated from each other by intervening steel plates. One disadvantage of an energy-absorbing device using only elastomer pads is the large number of pads that have to be assembled to absorb sufficient energy under a particular force application.

SUMMARY OF THE INVENTION

It is, therefore, a prime objective of the present invention to provide an energy-absorbing device which incorporates the features of resilient material compressibility with hydraulic application.

Another object of the invention is to use seals made from elastomer material which is wear resistant and which can be initially placed under greater sealing pressure.

Another object of the invention is to provide a buffer cartridge using an elastomer material between moving and stationary components.

A still further object of the invention is to provide an hydraulic component with an accumulator for reducing fluid pressure within the cylinder.

The uniqueness of this product lies in the synergistic combination of elastomer and hydraulic shock absorbing technologies into an Elastomer/Hydraulic Hybrid which exhibits static and dynamic behavior superior to that of either parent technology. During static compression, only the elastomer pad stack around the hydraulic cylinder absorbs significant energy, the hydraulic cylinder does not contribute to energy transfer. However, during dynamic compression, both the hydraulic cylinder and the elastomer pad stack absorb energy. Thus, the hydraulic cylinder is velocity sensitive and the elastomer pad stack is relatively velocity insensitive with regard to energy absorption. The combination of these characteristics result in a shock absorber which exhibits a varied response to impacts, depending on impact speed, i.e., low speed impacts encounter a "soft" shock absorber, while high speed impacts encounter a "stiffer" shock absorber capable of absorbing large amounts of energy. About half of the energy absorbed by an elastomer pad stack is stored as elastic energy which is released in the form of recoil energy. The hydraulic element, on the other hand, transfers virtually all of its impact energy to the inelastic hydraulic fluid. By combining these two elements, the recoil of the elastomer element is damped by the hydraulic element. Similarly, the elastomer element provides the recoil energy required to retract the inelastic hydraulic element.

As previously mentioned, one of the most critical drawbacks of conventional hydraulic cylinders is their propensity for leakage. This leakage most frequently occurs at the dynamic seal between the cylinder and piston rod and is a result of wear of either the seal itself or the seal's mating surfaces. Central to the design of the hydraulic portion of the Elastomer/Hydraulic Hybrid technology is the use of the trademark "Accu Seal" an elastomer accumulator/seal which both statically seals the hydraulic fluid inside the cylinder and compensates for length and volume changes during cylinder operation. "Accu Seal" is a trademark of Miner Enterprises, Inc. Rather than the conventional dynamic wiping seal, this design incorporates static seals which are not subject to wear of their dynamic counterparts, nor do they require the conventional polished piston rod surface. In the particular configuration of this design, one end of the (ACCU SEAL) lies over sealing grooves on the piston rod and is extruded into said grooves by radial compression applied by a bandclamp. The other end of the (ACCU SEAL) is sealed to the walls of the cylinder using a threaded pressure intensified sealing cap which serves to extrude the flange of the (ACCU SEAL) into a sealing groove in the cylinder walls. The convoluted section of the (ACCU SEAL) works as an accordion, collapsing and extending as required to accommodate changes in length during cylinder operation. Finally, the bulbous portion of the Accu Seal operates essentially by inflating and deflating to accommodate changes in available volume for the hydraulic fluid within the cylinder during operation. This, of course, is a critical function without which the entire cylinder would be an essentially incompressible, and therefore inoperable, unit.

In addition to the (ACCU SEAL), a dynamic piston seal is required for the cylinder to operate. In this particular design configuration, the dynamic piston seal is an integral part of the piston itself, a cup-shaped elastomer element molded over a rigid piston hub. The rigid hub is required to withstand the high pressures encountered inside the cylinder during dynamic operation. In addition, it provides a convenient location for the fluid orifices The cup-shape of the piston face creates a pressure intensified seal to the cylinder walls during dynamic operation of the cylinder. The durability of the elastomer portion of the piston in combination with the large wear surface it shares with the walls of the cylinder allows the use of a lower quality surface finish inside the cylinder without significantly detracting from the life of the seal.

A buffer cartridge for absorbing energy comprises an hydraulic component and a resilient material energy-absorbing component. The hydraulic component comprises a cylinder partly filled with hydraulic fluid which is subjected to a force applied thereto by a piston connected to a piston rod extending through an upper end of the cylinder and connected through a top plate to a pad spacer tube having a lower end engaging an upper end of a stack of pads made from elastomer material, the pads being separated from each other by spacer plates. The pads and spacer plates have corresponding central openings and are mounted about the cylinder. The piston comprises a metal piston hub having an internal threaded surface for a threaded engagement with the lower end of the piston rod, the piston hub being embedded in a piston seal made from elastomeric material. The piston seal and the piston hub are provided with intercommunicating orifices which permit flow of fluid from one side of the piston to the other side. In other words, the lower chamber in the cylinder, below the piston, communicates through the orifices with an upper chamber in the cylinder, on the backside of the piston. Extending from the backside of the piston and sealingly engaging the piston rod is an accumulator-seal having a bulbous configuration adjacent the inner wall of the cylinder. The upper end of the accumulator has a flange which is rigidly and sealingly secured to the inner wall of the cylinder by a ring embedded in the cylinder wall and a cap which is threadedly engaged with the open end of the cylinder. The upper end of the piston rod is concentrically located with respect to the cylinder by a bushing which, upon being forced by a cap, applies a force to the flange to achieve a seal with the cylinder. The accumulator is made from elastomer material which defines a sealing casing about the portion of the piston rod extending into the cylinder. The lower end of the accumulator is secured adjacent to the piston so that the accumulator will stretch upon application of a force applied to the top plate of the buffer cartridge.

DESCRIPTION OF THE PREFERRED EMBODIMENT

Figure 1:
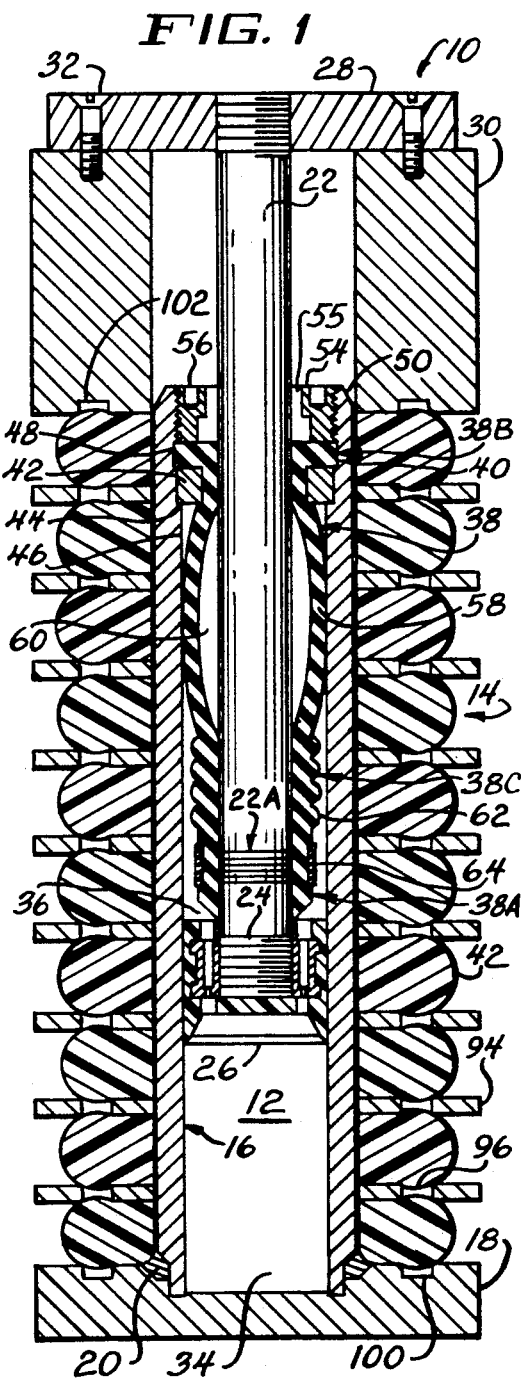
FIG. 1 is a longitudinal cross-sectional view of an energy-absorbing buffer cartridge in an extended position.

Referring to the drawings, an energy-absorbing buffer cartridge 10 comprises a hydraulic component 12 and a resilient material energy-absorbing component 14.

The hydraulic component 12 comprises a cylinder 16 having a lower end secured to a bottom plate 18 by appropriate means such as welds 20. Concentrically located in the interior of the cylinder 16 is a piston rod 22 having a lower threaded end 24 threadedly engaged with a piston 26. The other end of the piston rod 22 is threadedly engaged with a top plate 28 to which is secured a pad spacer tube 30 by appropriate means such as screws 32. The piston 26 defines a lower chamber 34 and an upper chamber 36 in the interior of the cylinder 16. Positioned about the piston rod 22 is an accumulator seal 38 which has static seals 38A and 38B. The static seal 38A lies over sealing grooves 22A on the piston rod 22 and is extruded into the grooves by radial compression applied by a bandclamp 64 to the piston rod 22 adjacent the piston 26. The accumulator seal 38 has an upper end defined by a flange 40 which has a lower surface abutting a ring 42 seated on a shoulder 44 developed in the interior wall 46 of the cylinder 16. The periphery of the flange 40 extends into a groove 48 in the interior wall 46 of the cylinder 16. The upper end 50 of the cylinder 16 has a threaded opening 52 for receiving a threaded pressure intensifying sealing cap 54 provided with apertures 56 which are engageable by a tool (not shown) for screwing in the bushing 54 to compress the flange 40 against the ring 42. The static seal 38B at the other end of the accumulator seal 38 is sealed to the walls of the cylinder 16 using a threaded pressure intensified sealing cap 54. Interposed between the cap 54 and the piston rod 22 is a bushing 55 which provides a sliding surface for the piston rod 22. The cap 54 has a shoulder 57 which applies a force to a seat 59 on the bushing 55 to compress the flange 40 against the piston rod 22 and against the groove 48. The accumulator seal 38 has a bulbous configuration 58 which defines an accumulator space 60 as shown in FIG. 1 when the energy-absorbing cartridge 10 is in an extended position, that is, no force has been applied to the top plate 28 to push downwardly the piston 26. The exterior surface of the accumulator seal 38, just below the bulbous configuration 58, is provided with a plurality of convolutions 62. In this particular development, the static seal 38A of the accumulator seal 38 was secured to the piston rod 22 by the bandclamp 64, but other means of securement can be used.

Figure 3:
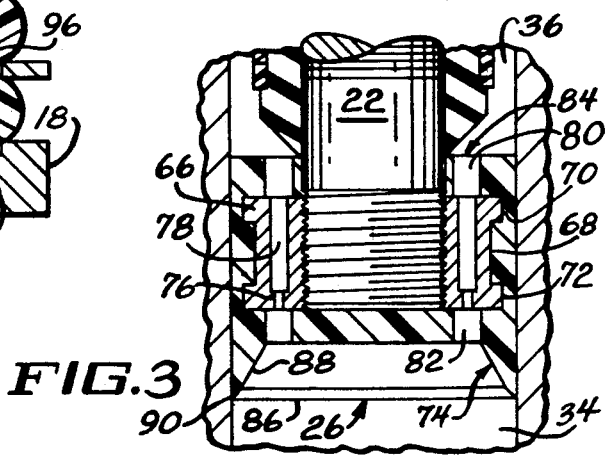
FIG. 3 is an enlarged fragmentary cross-sectional view of a piston slidably engaged with an inner wall of a cylinder.

The piston 26 comprises a piston hub 66 which is in the form of a short metal cylinder 68 provided with upper 70 and lower 72 flanges. As shown in FIG. 3, the piston hub 66 is entirely encapsulated in the material of a piston seal 74. The piston hub 66 is provided with a number of orifices 76 which communicate with bores 78. The piston 74 is provided with a corresponding number of apertures 80, 82, which complete passageways 84 to permit flow of fluid between the lower chamber 34 and the upper chamber 36. The interior wall surface of the piston hub is threaded for threaded engagement with the lower threaded end 24 on the piston rod 22. A liquid sealant is used to obtain a perfect seal in the threaded engagement between the piston rod 22 and the piston hub 66.

To provide improved sealing between the exterior surface of the piston seal 74 and the interior wall 46 of the cylinder 16, a bottom portion of the piston seal 74 has a cup-shaped configuration 86 having an angled wall 88 extending inwardly from a rim 90 so that, when a force is applied to the top plate 28, the pressure developed on the fluid in the lower chamber 34 will act on the angled wall 88 to force it against the inner wall of the cylinder 16. As is readily apparent, the accumulator seal 38 functions as a seal between the piston rod 22 and the interior of the cylinder 16, and also acts to moderate the pressures existing in the accumulator space 60 and the upper chamber 36. The accumulator seal and the piston seal 74 are made from elastomeric material.

The energy-absorbing material component 14 comprises a stack of pads 92 (pad stack) made from elastomeric materials, and which possess a toroid configuration having a central opening so that they may be placed about the cylinder 16. The pads 92 are separated from each other by spacer plates 94, each of which is provided with a plurality of circumferentially spaced openings 96 which provide depressions into which the elastomeric material of the pads 92 can flow. The bottom plate 18 and the pad spacer tube 30 is provided with grooves 100 and 102, respectively. These grooves assist in anchoring the lowermost and uppermost pads.

Figure 2:
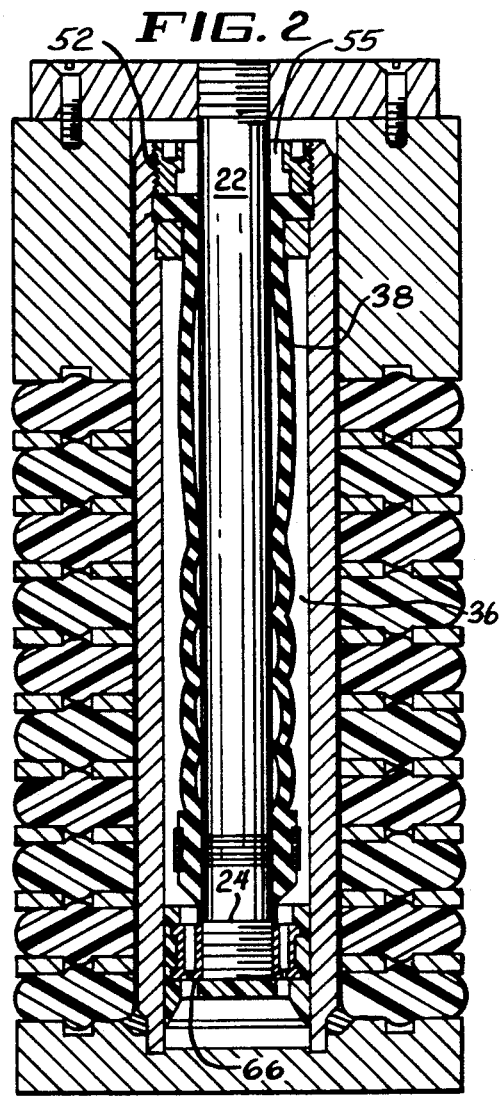
FIG. 2 is a longitudinal cross-sectional view of the buffer cartridge in a compressed position.

The energy absorbing cartridge 10 is shown in FIG. 1 in its extended state. When a force is applied to the top plate 28, the energy-absorbing cartridge will be compressed and assume the compressed state, as shown in FIG. 2. In the compressed state, the accumulator seal 38 is stretched out along the length of the piston rod 22. During compression, the hydraulic fluid in the lower chamber 34 will be forced through the apertures 82, the orifices 76, the bores 78, and out through the apertures 80 into the upper chamber 36. Despite the pressure developed in the upper chamber 36, no leakage of the hydraulic fluid can occur because the fluid does not come in contact with the piston rod 72. In other words, the sliding contact of the piston rod in the hydraulic component 12 is isolated from the hydraulic fluid. In the event that there is any leakage occurring in the sliding contact developed between the piston rod 22 and the accumulator seal 38, the worst that can happen is leakage of air.

In view of the nature of the elastomeric materials which are employed for making the accumulator seal 38 and the piston seal 74, this material adapts itself to providing excellent sealing and does not require that the surface of the piston rod 22 or the inner wall of the cylinder 16 be highly polished to avoid wear of the elastomeric material Having described the invention in detail and with sufficient particularity as to enable those skilled in the art to practice it, what is desired to be protected by Letters Patent is set forth in the following claims.

What is claimed is:

1. A buffer cartridge for absorbing energy comprising a hydraulic component cooperatively coupled with an energy-absorbing material component, said hydraulic component comprising a cylinder-piston arrangement, said energy-absorbing material component comprising a stack of pads made from resilient energy-absorbing material, each pad having a wall, and a toroidal configuration and stacked about the cylinder-piston, a spacer plate separating adjoining pads, means intercoupling said cylinder-piston arrangement and said stack of pads for receiving a compressive force to develop reactive forces simultaneously in both of said components, said cylinder-piston arrangement comprises an elongated cylinder having one end fixed to a base, a piston rod having one end defining a piston, means having a bore for closing the other end of said cylinder, the other end of said piston rod extending through said bore, an accumulator enveloping said piston rod and having one end secured to said piston rod adjacent said piston and having the other end clamped to the cylinder by said closing means, said accumulator being formed from elastomeric material, the other end of said accumulator defining a slidable seal about said piston rod, said piston including a piston seal provided with orifice means for movement of hydraulic fluid therethrough.

2. A buffer cartridge according to claim 1, wherein said piston comprises a metal piston hub having orifices opening into corresponding bores, said piston seal comprising an elastomeric material encapsulating said piston hub and having apertures in alignment with said orifices and bores to define flow passageways through said piston for movement of hydraulic fluid therethrough.

3. A buffer cartridge according to claim 2, wherein said piston seal has a free end, at said free end, a cup-shaped configuration having an inner angled wall extending outwardly and terminating in a thin rim, whereby, upon being subjected to fluid pressure, the angled wall and the rim will be forced in better sealing contact with a cylinder wall.

4. A buffer cartridge according to claim 1, wherein said piston seal has a free end, at said free end, a cup-shaped configuration having an inner angled wall extending outwardly and terminating in a thin rim, whereby, upon being subjected to fluid pressure, the angled wall and the rim will be forced in better sealing contact with a cylinder wall.

5. A buffer cartridge according to claim 1, wherein one elongated portion of said accumulator is provided with a bulbous configuration adjoining an inner wall of said cylinder, and another elongated portion of said accumulator is provided with spaced ribs.

6. A buffer cartridge according to claim 1, wherein said one end of said accumulator is secured to said piston rod with a bandclamp.

7. A buffer cartridge according to claim 1, wherein said cylinder has an inner surface, said closing means includes a ring embedded in the inner surface of said cylinder, said other end of said accumulator terminating in a flange and positioned on said ring, a bushing disposed about said piston rod and abutting said flange, a cap thredly engaged with said other end of said cylinder and abutting said flange and a seat on said bushing, whereby applying a torque to said cap will apply compression forces to said flange to obtain a sealing between an upper portion of said accumulator and adjoining portion of said cylinder.

8. A buffer cartridge for absorbing energy comprising a hydraulic component cooperatively coupled with an energy-absorbing material component, said hydraulic component comprising a cylinder-piston arrangement which includes a cylinder having a wall and a piston having a rod, said energy-absorbing material component comprising a stack of pads made from resilient energy-absorbing material, means intercoupling said cylinder-piston arrangement and said stack of pads for receiving a compressive force to develop reactive forces simultaneously in both of said components, means having a bore for closing an open end of a cylinder, an accumulator seal means enveloping a substantial portion of a piston rod and having one end secured to said piston rod adjacent a piston and having another end clamped to the cylinder by said closing means, said accumulator seal being formed from elastomeric material, said other end of said accumulator seal defining a slidable seal about said piston rod, said piston rod configured as a piston seal terminating one end of said piston rod.

9. A buffer cartridge according to claim 8, wherein said piston comprises a metal piston hub having orifices, said piston seal comprising an elastomeric material encapsulating said piston hub and having apertures in alignment with said orifices to define flow passageways through said piston for movement of hydraulic fluid therethrough.

10. A buffer cartridge according to claim 9, wherein said piston seal has a free end, at said free end, a cup-shaped configuration having an inner angled wall extending outwardly and terminating in a thin rim, whereby, upon being subjected to fluid pressure, the angled wall and the rim will be forced into better sealing contact with a cylinder wall.

11. A buffer cartridge according to claim 8, wherein an elongated portion of said accumulator seal is provided with a bulbous configuration adjoining an inner wall of said cylinder, and another elongated portion of said accumulator is provided with convolutions.

12. A buffer cartridge according to claim 8, wherein said one end of said accumulator is secured to said piston rod with a bandclamp.

13. A buffer cartridge according to claim 8, wherein said intercoupling means comprises a top plate secured to a free end of said piston rod, a cylindrical pad spacer tube, secured concentrically with respect to said piston rod, to said top plate, a free end of said pad spacer tube abutting a top of said stack of pads, a bottom plate for supporting said stack of pads, and means on both of said plates for anchoring the top-most and bottom-most pads.

14. A buffer cartridge according to claim 8, wherein said closing means includes a ring embedded in the inner surface of said cylinder, said other end of said accumulator seal terminating in a flange and positioned on said ring, a bushing disposed about said piston rod and abutting said flange, a cap threadly engaged with said other end of said cylinder and abutting said flange and a seat on said bushing, whereby applying a torque to said cap will apply compression forces to said flange to obtain a sealing between an upper portion of said accumulator seal and adjoining portion of said cylinder.

* * * * *